July 26, 1932.　　　　C. A. MARIEN　　　　1,869,107
PISTON RING EXPANDER AND METHOD OF MAKING THE SAME
Filed Dec. 24, 1930
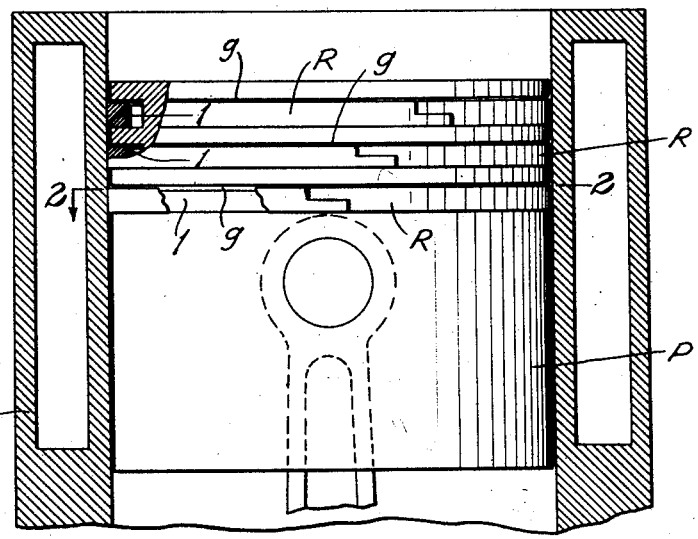
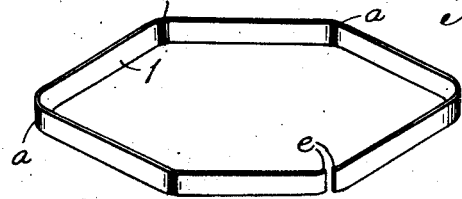
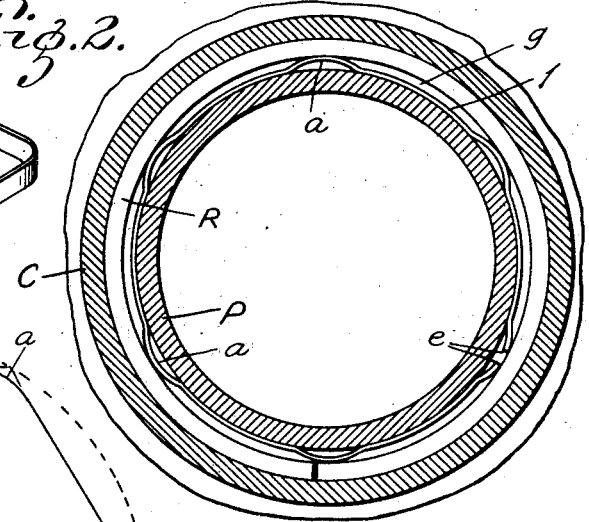
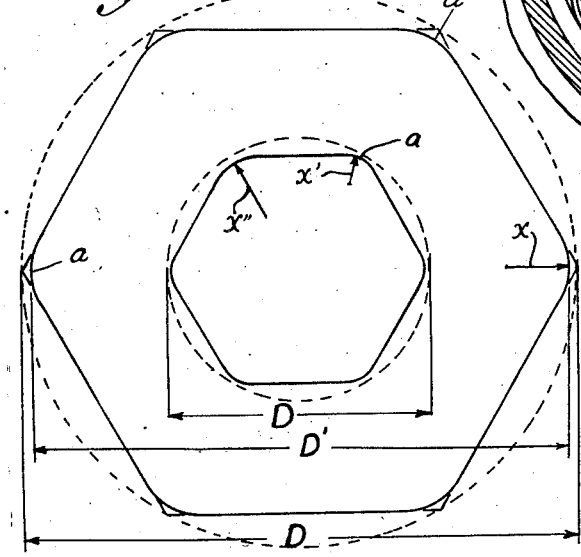
INVENTOR
CHARLES A. MARIEN.
BY Harry G. Beimer
ATTORNEY.

Patented July 26, 1932

1,869,107

UNITED STATES PATENT OFFICE

CHARLES A. MARIEN, OF ST. LOUIS, MISSOURI, ASSIGNOR TO RAMSEY ACCESSORIES MANUFACTURING CORPORATION, OF ST. LOUIS, MISSOURI, A CORPORATION OF MISSOURI

PISTON RING EXPANDER AND METHOD OF MAKING THE SAME

Application filed December 24, 1930. Serial No. 504,598.

My invention has relation to methods of manufacturing piston ring expanders and it consists in the novel features of construction more fully set forth in the specification and pointed out in the claims.

It will be readily understood that the value of an expander interposed between the piston ring and the bottom of the groove depends essentially on two factors: viz. the property of imposing the proper amount of tension on the ring and the permanence of this property. The proper amount of tension is dependent on the size of the expander and the stiffness thereof, while the permanence of this tension depends on the shape of the expander and the method of manufacturing it.

The object of the present invention is to provide a method of manufacturing expanders that will ensure that the above properties be realized to the fullest extent, and that will eliminate guess-work from expander manufacture. Under the old methods of manufacturing expanders it is merely a fortuitous circumstance when an excellent product is produced, while under my improved method, involving mathematical precision, the expanders will be uniformly excellent. This will be more readily apparent from a detailed description of the invention in connection with the accompanying drawing, in which:

Figure 1 is a side elevation of a piston equipped with rings and expanders made by my improved method; Fig. 2 is a horizontal cross-section taken on the line 2—2 of Fig. 1; Fig. 3 is a perspective view of a detached expander; and Fig. 4 is a diagrammatic view illustrating certain essential features of the invention.

Referring to the drawing, P represents a piston operable in the engine cylinder C, said piston having rings R, R, R fitted into grooves $g$, $g$, $g$ into which expanders $l$, $l$, $l$ are also fitted. As pointed out above, the expanders are provided for exerting tension on the ring so it will be forced outwardly to hug the cylinder wall with substantially uniform pressure throughout its circumference. This expander pressure is best obtained by making the expander polygonal in shape so that it will have to be distorted from its true polygonal shape when forced into groove $g$ between ring R and the bottom of the groove. In order that the pressure may be exerted equally entirely around the circumference of the ring, the size of the expander must be such that when it is distorted and under tension the ends $e$, $e$ thereof will almost meet. From this it follows that the perimeter of the expander must bear a definite relation to the inside diameter of the piston ring. This brings us to the first step in the process of manufacturing the expander: viz., the cutting of the ribbon of metal to a length that has been precalculated for an expander adapted to cooperate with a certain size ring.

The next step is to bend the ribbon of spring metal into a polygonal (preferably hexagonal) shape. This is done with a forming die which crimps the rounded corners $a$ into the ribbon to the extent necessary to produce the hexagon (or other polygon). The radius $x$ that is used to describe the arc of the bend of the corners $a$ is a matter of importance. This radius must, of course, be small enough to effect a permanent deformation of the metal at the corner so that the ribbon will not immediately straighten out again after removing the forming die; at the same time the bend must not be so sharp as to strain the metal to the point where a fracture may result. In other words, the ribbon should be bent just sufficiently beyond the elastic limit to effect permanent deformation. Then too, the radius of the arc defining the corners of the hexagon determines the final shape of the expander, and the greater the radius is, the more nearly the expander will approach a circle in shape, and the more the diameter of a circle circumscribed around the hexagon will be reduced. (See Fig. 4). When it is remembered that the perimeter of the hexagon is fixed, having been calculated to bear a definite relation to the piston ring, it will be apparent that the radius of the arcs defining the corners should also be fixed. I have found by experiment that the ideal radius $x$ for any size of expander should be one-ninth of the diameter $D$ of a circle circumscribed about a hexagon, (as shown Fig. 4) the perimeter of which has been per-calculated on the basis of the diameter of the ring with which the expander is to cooperate. When the bends are made with this radius (1/9 D.) the corners are set but not subjected to excessive strain, and the distance $D'$ (Fig. 4) across the expander from one corner to the other is correct for imposing the proper degree of tension on the piston ring (Fig. 2).

It is now the practice among some manufacturers to adopt a standard radius for the corners of all expanders irrespective of size. If this radius is correct for a large expander it will make a small expander too round. This is apparent by comparing radius $x'$ of the small expander diagram with radius $x''$ of said diagram, the radius $x''$ being equal to the radius $x$ of the diagram of the large expander.

After the expander has been bent into shape, it could be put into use, but since the metal at the bends has not been seriously strained, these bends will have a tendency to flatten out again. This tendency will, of course, reduce the tension of the expander against the piston ring and shorten the efficient life of the expander. In order to set these corner bends I have found that applying heat to the expander is very effective. Subjecting the expanders to a temperature of 500°–700° for about 10 minutes, called "normalizing" makes the bends permanent and does not seriously affect the temper of the metal.

At least, the advantage gained by setting the bends outweighs whatever disadvantage results from the slight annealing of the metal. Actual tests of expanders made by the herein-described process show that the tension by weight has increased approximately 25% and the flexibility thereof has also increased about 25%.

Having described my invention I claim:

1. The method of manufacturing piston ring expanders which comprises forming a ribbon of spring metal into a polygonal shape with arcuate corners, the perimeter of said polygon bearing a definite relation to the circumference of the piston ring, and the radius defining the arc of said corners being one-ninth the diameter of a circle circumscribed around said polygon.

2. In combination with a piston ring, an expander therefor, said expander comprising a ribbon of spring metal formed in a general polygonal shape with arcuate corners, the perimeter of said polygon bearing a definite relation to the circumference of the ring, the radius defining the arc of said corners being one-ninth the diameter of a circle circumscribing said polygon.

In testimony whereof I hereunto affix my signature.

CHARLES A. MARIEN.